US012078910B2

(12) United States Patent
Won et al.

(10) Patent No.: US 12,078,910 B2
(45) Date of Patent: Sep. 3, 2024

(54) BEAM DEFLECTOR AND 3-DIMENSIONAL DISPLAY DEVICE INCLUDING THE SAME

(71) Applicant: SAMSUNG ELECTRONICS CO., LTD., Suwon-si (KR)

(72) Inventors: Kanghee Won, Seoul (KR); Young Kim, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 590 days.

(21) Appl. No.: 17/324,489

(22) Filed: May 19, 2021

(65) Prior Publication Data

US 2022/0137479 A1 May 5, 2022

(30) Foreign Application Priority Data

Oct. 30, 2020 (KR) .................. 10-2020-0143882

(51) Int. Cl.
*G02F 1/29* (2006.01)
*G02B 27/00* (2006.01)
(Continued)

(52) U.S. Cl.
CPC ........... *G02F 1/29* (2013.01); *G02B 27/0093* (2013.01); *G02B 30/00* (2020.01);
(Continued)

(58) Field of Classification Search
CPC ................. G02F 1/29; G02F 1/133776; G02F 1/134381; G02F 1/13706; G02F 1/292;
(Continued)

(56) References Cited

U.S. PATENT DOCUMENTS 8,502,953 B2   8/2013  Im
8,610,838 B2  12/2013  Kim et al.
(Continued)

FOREIGN PATENT DOCUMENTS

KR  10-2015-0117136 A  10/2015
KR  10-2018-0052356 A   5/2018
WO  WO-2020146981 A1 *  7/2020  ............... G02F 1/29

OTHER PUBLICATIONS

English Machine Translation of Wang et al (WO 2020146 981A1) (Year: 2023).*

*Primary Examiner* — Donald L Raleigh
(74) *Attorney, Agent, or Firm* — Sughrue Mion, PLLC

(57) ABSTRACT

A beam deflector includes a first electrode layer including a plurality of line electrodes extending in a first direction and arranged parallel to each other in a second direction crossing the first direction; a second electrode layer separated from the first electrode layer by a predetermined distance to face the first electrode layer; and a deflection layer between the first electrode layer and the second electrode layer and having a plurality of optically anisotropic molecules controlled by an electric field formed between the first electrode layer and the second electrode layer. Each of the optically anisotropic molecules has an ellipse shape having a major axis and a minor axis, wherein the major axis is arranged to head for the first direction.

20 Claims, 18 Drawing Sheets

(51) Int. Cl.
  *G02B 30/00* (2020.01)
  *G02F 1/1337* (2006.01)
  *G02F 1/1343* (2006.01)
  *G02F 1/137* (2006.01)
  *G03H 1/00* (2006.01)
  *G03H 1/22* (2006.01)

(52) U.S. Cl.
  CPC .. *G02F 1/133776* (2021.01); *G02F 1/134381* (2021.01); *G02F 1/13706* (2021.01); *G02F 1/292* (2013.01); *G03H 1/0005* (2013.01); *G03H 1/2294* (2013.01); *G02F 2203/24* (2013.01); *G03H 2001/0088* (2013.01)

(58) Field of Classification Search
  CPC ............... G02F 2203/24; G02F 1/1313; G02F 1/133723; G02F 1/133738; G02F 1/133749; G02F 1/133784; G02F 1/133528; G02B 27/0093; G02B 30/00; G02B 30/33; G03H 1/0005; G03H 1/2294; G03H 2001/0088; G03H 2223/23; G03H 1/268
  See application file for complete search history.

(56) References Cited

U.S. PATENT DOCUMENTS

| | | | |
|---|---|---|---|
| 9,869,969 B2* | 1/2018 | Song | G02B 26/005 |
| 2014/0104545 A1 | 4/2014 | Miyazawa et al. | |
| 2014/0340292 A1* | 11/2014 | Kashiwagi | G02B 30/27 345/87 |
| 2018/0129105 A1 | 5/2018 | Kim et al. | |
| 2021/0216148 A1* | 7/2021 | Wang | G02F 1/29 |
| 2021/0352266 A1 | 11/2021 | Kim et al. | |

* cited by examiner

BEAM DEFLECTOR AND 3-DIMENSIONAL DISPLAY DEVICE INCLUDING THE SAME

CROSS-REFERENCE TO RELATED APPLICATION

This application is based on and claims priority under 35 U.S.C. § 119 to Korean Patent Application No. 10-2020-0143882, filed on Oct. 30, 2020, in the Korean Intellectual Property Office, the disclosure of which is incorporated by reference herein in its entirety.

BACKGROUND

1. Field

The disclosure relates to a beam deflector and a three-dimensional (3D) display device including the beam deflector.

2. Description of Related Art

A holographic display device, which is a type of a 3D display device, is regarded as the most advanced 3D display device since it can express a clear 3D image in a wide depth expression region without eye fatigue. However, in order to implement a 3D image, a high-resolution spatial light modulator (SLM) with wavelength-sized pixels, a surface light source having high coherence, and large computational capabilities for computer generated holograms (CGH) are required.

Recently, in order to alleviate the conditions of data throughput and resolution, a binocular hologram method in which holographic images are provided only in a viewing area corresponding to both eyes of a viewer has been proposed. For example, only a holographic image having a viewpoint corresponding to the left eye field of view and a holographic image having a viewpoint corresponding to the right eye field of view of a viewer are generated and provided to each of the viewer's left and right eyes. In this case, since it is unnecessary to generate holographic images for remaining viewpoints, a data throughput may be greatly reduced and also a resolution condition of a spatial light modulator may be satisfied even with a currently commercially available display device.

The holographic display device provides a 3D image to a user through a method in which a general image signal is converted into a holographic image signal, and then, the holographic image signal is sent to both eyes (the left eye and right eye) by using an optical system. In this case, in order to deflect and send a beam of the converted image to each of the user's left and right eyes, an optical system including a mechanical part having a very large volume is used.

Optical systems for deflecting a beam may include micro-electro-mechanical systems (MEMS) scanners, galvano mirrors, linear spatial light modulators (Linear SLM), or a liquid crystal beam deflector. Among them, the beam deflector including an optically anisotropic material (e.g., liquid crystal) has a structure formed by injecting an optically anisotropic material between lower and upper electrodes, and thus, it may be optimized to have a relatively small volume compared to other optical systems.

SUMMARY

Provided are beam deflectors that minimize a phase loss of incident light due to a fringing-field effect by appropriately controlling an arrangement direction of optically anisotropic materials (e.g., liquid crystals) and 3D display devices including the beam deflectors.

However, the technical problems to be achieved are not limited to the above technical problems.

Additional aspects will be set forth in part in the description which follows and, in part, will be apparent from the description, or may be learned by practice of embodiments of the disclosure.

In accordance with an aspect of the disclosure, a beam deflector includes a first electrode layer including a plurality of line electrodes, each of the plurality of line electrodes extending in a first direction and arranged parallel to each other in a second direction crossing the first direction; a second electrode layer separated from the first electrode layer by a predetermined distance to face the first electrode layer; and a deflection layer between the first electrode layer and the second electrode layer, the deflection layer including a plurality of optically anisotropic molecules controlled by an electric field formed between the first electrode layer and the second electrode layer, wherein each of the plurality of optically anisotropic molecules has an ellipse shape having a major axis and a minor axis, wherein the major axis of each of the plurality of optically anisotropic molecules is arranged to head for the first direction.

The major axis of each of the plurality of optically anisotropic molecules may be arranged to be inclined by a first angle $\theta_1$ with respect to a central axis extending in the first direction, and the first angle $\theta_1$ may be in a range of $-5° \leq \theta_1 \leq 5°$.

The major axis of each of the plurality of optically anisotropic molecules may be inclined by a second angle $\theta_2$ in a third direction perpendicular to both the first direction and the second direction with respect to the central axis extending in the first direction.

The second angle $\theta_2$ may be in a range of $-5° \leq \theta_2 \leq 5°$.

The beam may further include a first alignment layer between the first electrode layer and the deflection layer, wherein a plurality of first grooves are arranged on a surface of the first alignment layer at positions corresponding to the plurality of line electrodes, and wherein the plurality of first grooves extend in a direction inclined by the first angle $\theta_1$ in the second direction with respect to a central axis extending in the first direction in the plane that is parallel to the first direction and the second direction.

The plurality of optically anisotropic molecules may be arranged in a line along a region corresponding to the plurality of first grooves.

The beam deflector may further include a second alignment layer between the second electrode layer and the deflection layer, wherein a plurality of second grooves are arranged on a surface of the second alignment layer at positions corresponding to the plurality of line electrodes, and wherein the plurality of second grooves extend in the direction inclined by the first angle $\theta_1$ in the second direction with respect to the central axis extending in the first direction in the plane that is parallel to the first direction and the second direction.

The plurality of second grooves may be provided to face the plurality of first grooves.

The predetermined distance between the first electrode layer and the second electrode layer may be in a range from about 1.5 μm to about 6.0 μm.

A separation distance in the second direction between two adjacent line electrodes among the plurality of line electrodes may be in a range from about 1.0 μm to about 6.0 μm.

The predetermined distance between the first electrode layer and the second electrode layer may be equal to a separation distance in the second direction between two adjacent line electrodes among the plurality of line electrodes.

Each of the plurality of optically anisotropic molecules may have a positive-type dielectric anisotropy.

Each of the plurality of optically anisotropic molecules may include a liquid crystal molecule.

The second electrode layer may have a flat plate shape facing all of the plurality of line electrodes.

In accordance with an aspect of the disclosure, a 3D display device includes a light source configured to provide a coherent light; a beam deflector configured to deflect light from the light source, the beam deflector including a first electrode layer including a plurality of line electrodes, each of the plurality of line electrodes extending in a first direction and arranged parallel to each other in a second direction crossing the first direction; a second electrode layer separated from the first electrode layer by a predetermined distance to face the first electrode layer; and a deflection layer between the first electrode layer and the second electrode layer, the deflection layer including a plurality of optically anisotropic molecules controlled by an electric field formed between the first electrode layer and the second electrode layer; and a spatial light modulator configured to diffract incident light from the beam deflector to form a holographic image, wherein each of the plurality of optically anisotropic molecules has an ellipse shape having a major axis and a minor axis, wherein the major axis of each of the plurality of optically anisotropic molecules is arranged to head for the first direction.

The major axis of each of the plurality of optically anisotropic molecules may be arranged to be inclined by a first angle $\theta_1$ with respect to a central axis extending in the first direction, and the first angle $\theta_1$ may be in a range of $-5° \leq \theta_1 \leq 5°$.

The beam deflector may further include a first alignment layer between the first electrode layer and the deflection layer, wherein a plurality of first grooves are arranged on a surface of the first alignment layer at positions corresponding to the plurality of line electrodes, and wherein the plurality of first grooves extend in a direction inclined by the first angle $\theta_1$ in the second direction with respect to a central axis in the first direction in the plane that is parallel to the first direction and the second direction.

The plurality of optically anisotropic molecules may be arranged in a line along a region corresponding to the plurality of first grooves.

The 3D display device may further include an eye tracking sensor configured to sense positions of left and right eyes of a viewer; and a controller configured to control the beam deflector based on the sensed positions of the left and right eyes of the viewer.

The 3D display device may further include a light guide unit between the light source and the spatial light modulator, the light guide unit being configured to enlarge the coherent light provided from the light source to fit a size of the spatial light modulator.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
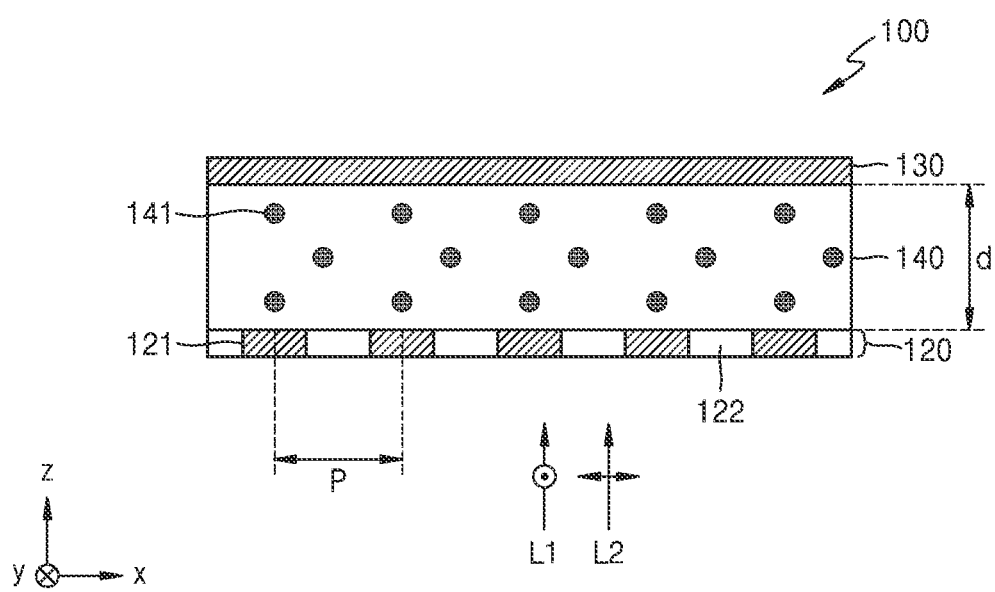
FIG. 1 is a schematic diagram illustrating a configuration of a beam deflector according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, like reference numerals refer to like elements throughout, and sizes and thicknesses of elements may be exaggerated for clarity and convenience of explanation.

Hereinafter, it will be understood that when an element or layer is referred to as being "on" or "above" another element or layer, the element or layer may be directly on another element or layer or intervening elements or layers. The singular forms are intended to include the plural forms as well, unless the context clearly indicates otherwise. It should be understood that, when a part "comprises" or "includes" an element in the specification, unless otherwise defined, other elements are not excluded from the part and the part may further include other elements.

The term "above" and similar directional terms may be applied to both singular and plural. All examples or example terms are simply used to explain in detail the technical scope of the disclosure, and thus, the scope of the disclosure is not limited by the examples or the example terms as long as it is not defined by the claims.

It will be understood that, although the terms 'first', 'second', etc. may be used herein to describe various elements, these elements should not be limited by these terms. These terms are only used to distinguish one element from another.

Figure 2:
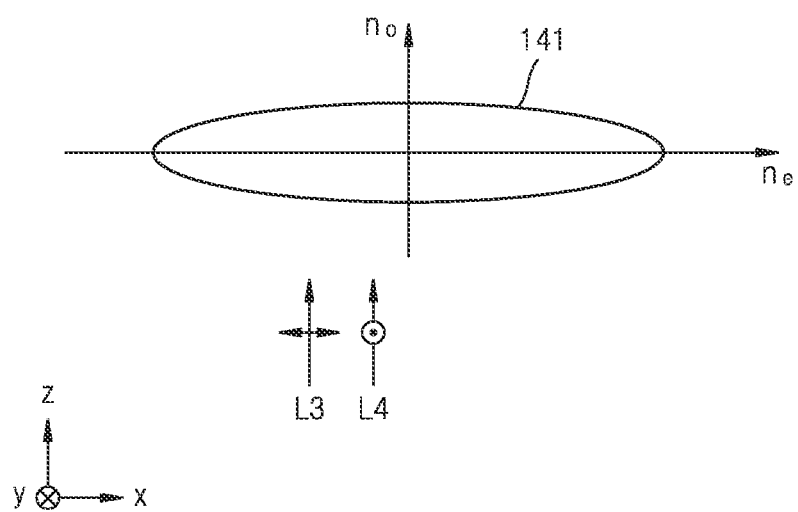
FIG. 2 is a schematic diagram illustrating a configuration of one of a plurality of optically anisotropic molecules of FIG. 1 according to an embodiment.
Figure 3:
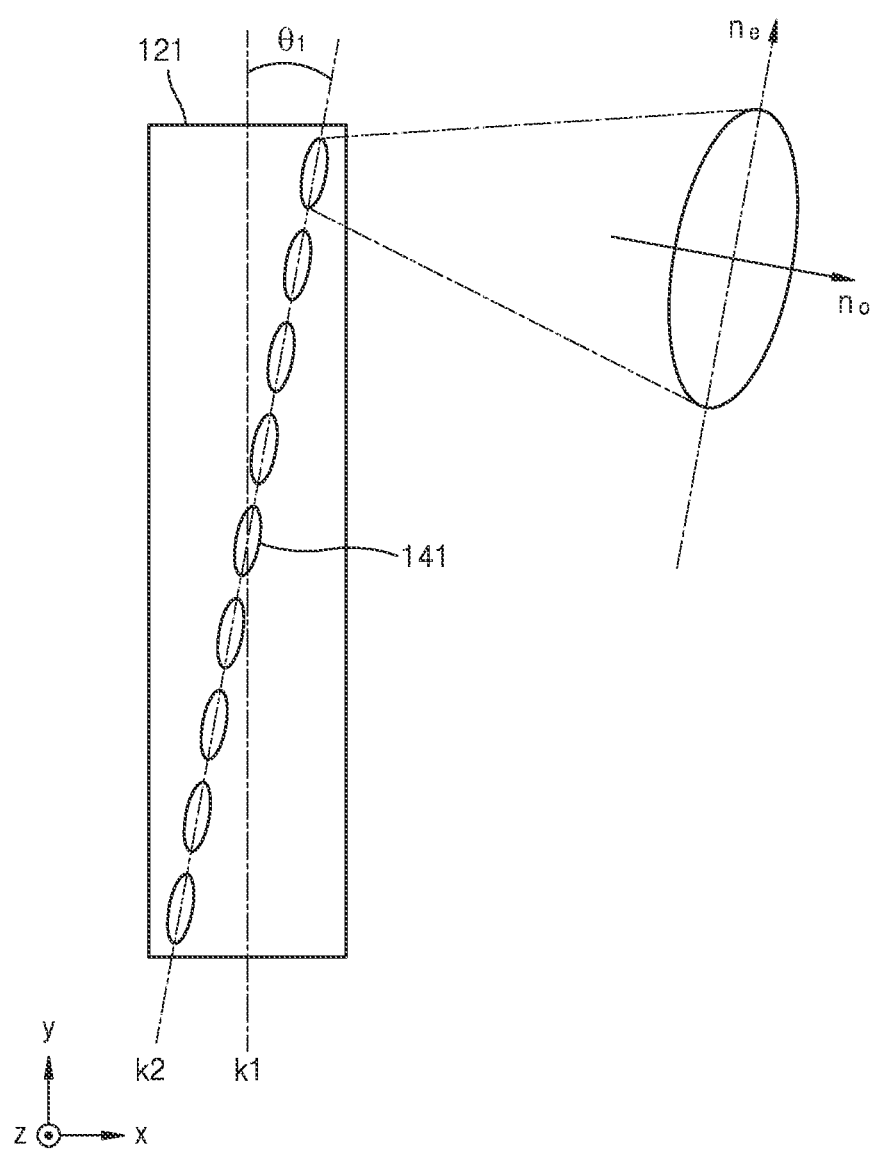
FIG. 3 is a schematic diagram illustrating an arrangement structure of a plurality of optically anisotropic molecules and any one of a plurality of line electrodes of FIG. 1 according to an embodiment.
Figure 4:
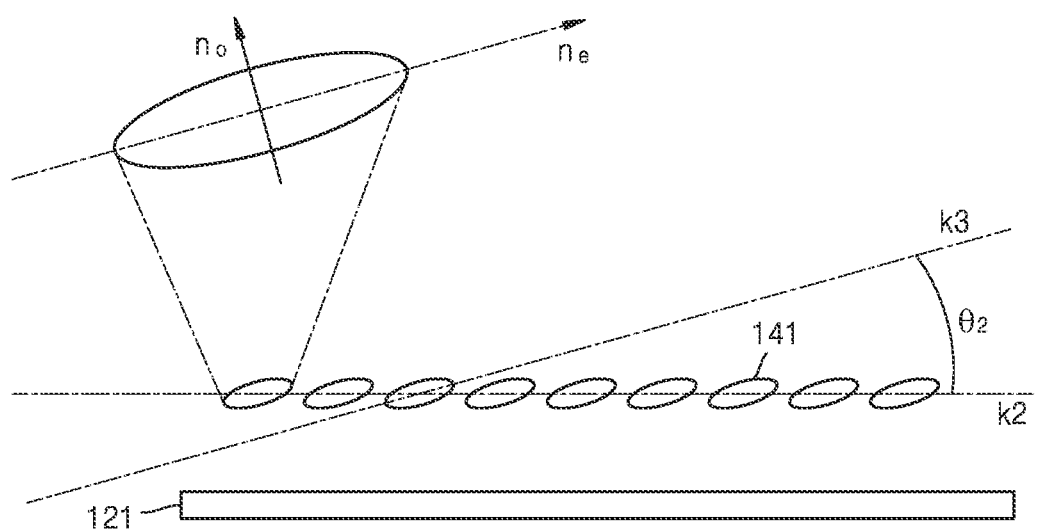
FIG. 4 is a schematic diagram illustrating another arrangement structure of one of a plurality of line electrodes of FIG. 1 and a plurality of optically anisotropic molecules according to an embodiment.
Figure 5:
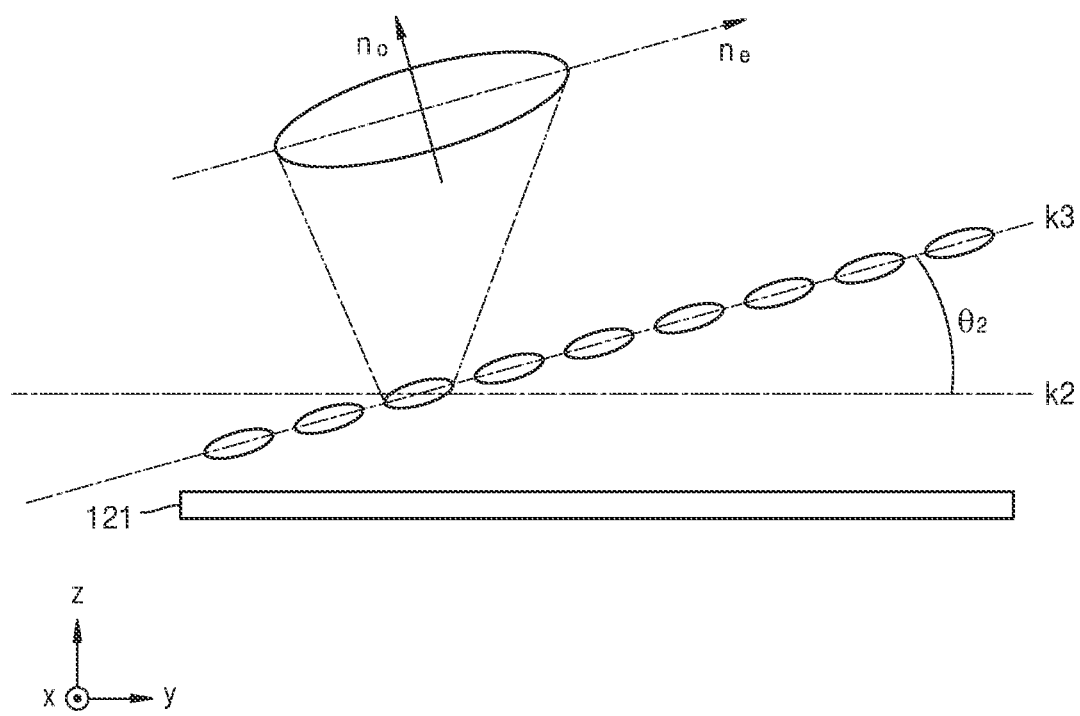
FIG. 5 is a schematic diagram illustrating another arrangement structure of one of a plurality of line electrodes of FIG. 1 and a plurality of optically anisotropic molecules according to an embodiment.

FIG. 1 is a schematic diagram illustrating a configuration of a beam deflector 100 according to an embodiment. FIG. 2 is a schematic diagram illustrating a configuration of any one of a plurality of optically anisotropic molecules 141 of FIG. 1. FIG. 3 is a schematic diagram illustrating an arrangement structure of the plurality of optically anisotropic molecules 141 and any one of a plurality of line electrodes 121 of FIG. 1. FIG. 4 is a schematic diagram illustrating another arrangement structure of one of the plurality of line electrodes 121 of FIG. 1 and the plurality of optically anisotropic molecules 141. FIG. 5 is a schematic diagram illustrating another arrangement structure of one of the plurality of line electrodes 121 of FIG. 1 and the plurality of optically anisotropic molecules 141.

Referring to FIG. 1, the beam deflector 100 may include: a first electrode layer 120 including a plurality of line electrodes 121 extending in a first direction (a y-axis direction) and arranged parallel to each other in a second direction (an x-axis direction) crossing the first direction (the y-axis direction); a second electrode layer 130 spaced apart by a predetermined distance to face the first electrode layer 120; and a deflection layer 140 provided between first electrode layer 120 and the second electrode layer 130 and having a plurality of optically anisotropic molecules 141 that are controlled by an electric field formed between the first electrode layer 120 and the second electrode layer 130. Also, the beam deflector 100 may further include an insulating material 122 between the plurality of line electrodes 121. Electrical short circuits between adjacent line electrodes 121 among the plurality of line electrodes 121 may be prevented by the insulating material 122. However, the disclosure is not limited thereto, and a part of the deflection layer 140 may be filled between the plurality of line electrodes 121 instead of the insulating material 122.

Figure 13:
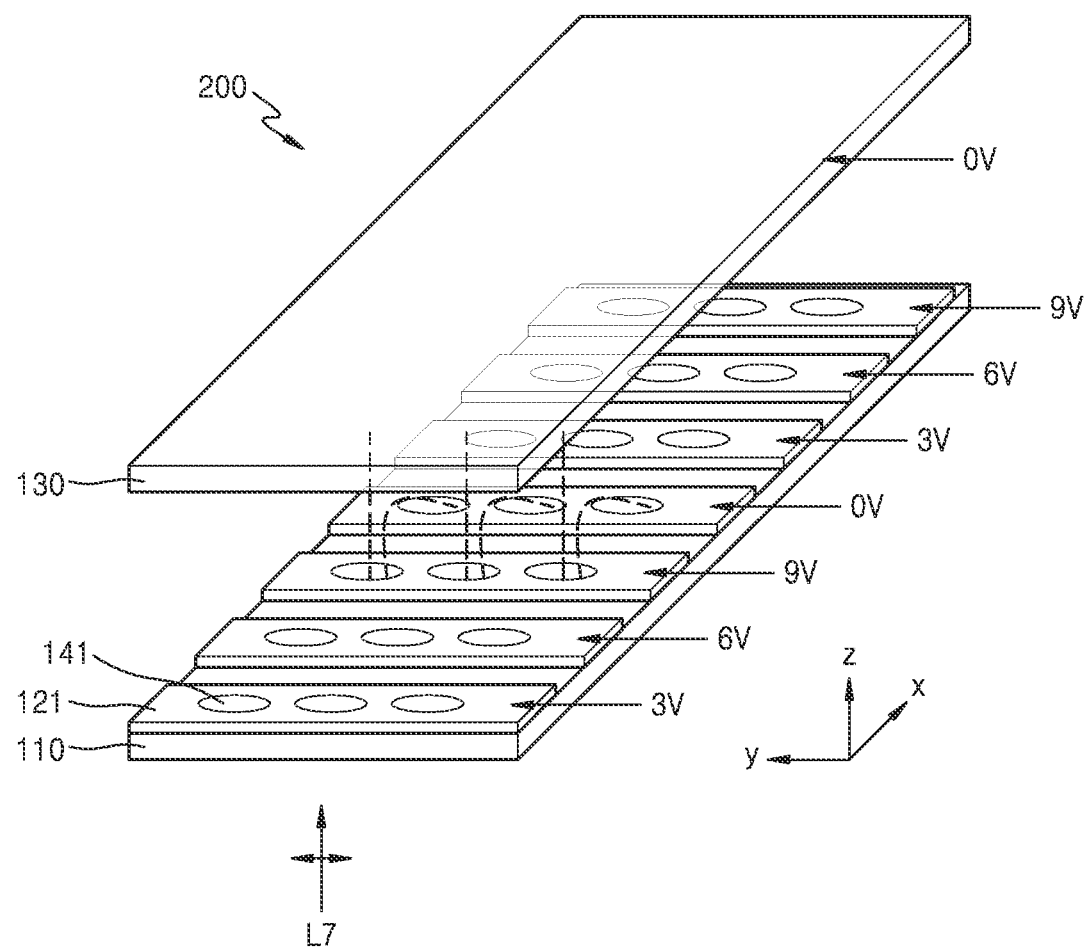
FIG. 13 is a schematic diagram illustrating an electric field formed when a voltage is applied to a plurality of line electrodes included in the beam deflector of FIG. 9 according to an embodiment.

The first electrode layer 120 may include a plurality of line electrodes 121 provided on a substrate 110 as shown, e.g., in FIG. 13. For convenience, five line electrodes 121 are shown in FIG. 1, but the first electrode layer 120 is not limited thereto and may include, for example, 720 line electrodes 121. That is, the total number of the plurality of line electrodes 121 included in the first electrode layer 120 may vary.

The plurality of line electrodes 121 may be formed to extend in the first direction (the y-axis direction) and may be arranged at regular intervals in a second direction (the x-axis direction) crossing the first direction (the y-axis direction). For example, the first direction (the y-axis direction) and the second direction (the x-axis direction) may cross each other. As a separation distance P between the plurality of line electrodes 121 is formed to be short, a diffraction angle or a deflection angle of light of the beam deflector 100 may increase. The separation distance P between two adjacent line electrodes 121 of the plurality of line electrodes 121 in the second direction (the x-axis direction) may be in a range from about 1.0 μm to about 6.0 μm. For example, the separation distance P between two adjacent line electrodes 121 among the plurality of line electrodes 121 in the second direction (the x-axis direction) may be about 2 μm. The plurality of line electrodes 121 may be arranged to have a same width in the second direction (the x-axis direction). The width of the plurality of line electrodes 121 in the second direction (the x-axis direction) may be about 1.5 μm.

The plurality of line electrodes 121 may include a transparent conductive material. For example, the plurality of line electrodes 121 may include indium-tin-oxide (ITO), indium-zinc-oxide (IZO), or indium-tin-zinc-oxide (ITZO).

The second electrode layer 130 may be a common electrode facing the entire plurality of line electrodes 121, and may be an electrode having a flat plate shape disposed apart by a predetermined distance so as to face the first electrode layer 120. However, the disclosure is not limited thereto, and the second electrode layer 130 may be implemented in the same shape as the plurality of line electrodes 121 of the first electrode layer 120. In this case, the same floating voltage may be applied to all of the plurality of line electrodes of the second electrode layer 130. The second electrode layer 130 may also include a transparent conductive material like the first electrode layer 120. A separation distance d between the second electrode layer 130 and the first electrode layer 120 may be in a range from about 1.5 μm to about 6.0 μm. For example, the separation distance d between the second electrode layer 130 and the first electrode layer 120 may be about 2 μm. Also, the separation distance d between the second electrode layer 130 and the first electrode layer 120 may be the same as the separation distance P between two adjacent line electrodes 121 among the plurality of line electrodes 121 in the second direction (the x-axis direction).

The deflection layer 140 may selectively deflect incident light according to a polarization state. For example, the deflection layer 140 may deflect incident light L1 of the first polarized light ⊙ parallel to the first direction, but may not deflect incident light of second polarized light ↔ perpendicular to the first polarized light ⊙. To this end, the deflection layer 140 may include a plurality of optically anisotropic molecules 141 that are electrically controlled. The plurality of optically anisotropic molecules 141 may be controlled by an electric field formed between the first electrode layer 120 and the second electrode layer 130 by a voltage applied from an external voltage source. Optical anisotropy is a property that exhibits different refractive indices with respect to light of different polarizations. For example, the plurality of optically anisotropic molecules 141 may have different refractive indices with respect to light of the first polarized light ☉ and with respect to light of the second polarized light ↔. For example, the plurality of optically anisotropic molecules 141 may be liquid crystal molecules each having an elliptical shape having a major axis and a minor axis, but the plurality of optically anisotropic molecules 141 are not limited thereto. Hereinafter, a case in which the plurality of optically anisotropic molecules 141 are liquid crystal molecules will be described.

Referring to FIG. 2, the plurality of optically anisotropic molecules 141 that are elliptical liquid crystal molecules each may include a major axis $n_e$ and a minor axis $n_o$ perpendicular to the major axis $n_e$. In this case, the major axis $n_e$ or the minor axis $n_o$ may be referred to as a refractive index, and a difference between the major axis $n_e$ and the minor axis $n_o$ may be referred to as birefringence $n_e-n_o$. As shown in FIG. 2, in a state that the optically anisotropic molecule 141 is lying in a major axis $n_e$ direction (the x-axis direction), the birefringence $n_e-n_o$ of incident light L3 of the first polarized light ↔ polarized in a direction parallel to the major axis $n_e$ may be maximum, and in contrast, the birefringence $n_e-n_o$ of incident light L4 of the second polarized light ☉ polarized in a direction perpendicular to the major axis $n_e$ may be zero. Also, when a voltage is applied from the outside in the z-axis direction, the plurality of optically anisotropic molecules 141 may be oriented such that the major axes $n_e$ extend in parallel with the z-axis direction. In this case, the birefringence $n_e-n_o$ of the incident light L3 of the first polarized light ↔ and incident light L4 of the second polarized light ☉ all may be 0.

Before and after a voltage is applied to the optically anisotropic molecule 141 from the outside, a difference in birefringence $n_e-n_o$ must occur to cause a phase change of incident light. Accordingly, for the incident light L3 of the first polarized light ↔ polarized in a direction parallel to the major axis $n_e$ of the optically anisotropic molecule 141 that was directed in the x-axis direction before the voltage is applied in the z-axis direction, since a change in birefringence $n_e-n_o$ occurs before and after a voltage is applied, a phase change occurs. However, for the incident light L4 of the second polarized light ☉ polarized in a direction perpendicular to the major axis $n_e$ of the optically anisotropic molecule 141, which was directed in the x-axis direction before the voltage is applied, since no change in birefringence (ne−no) occurs before and after a voltage is applied, a phase change does not occur.

Referring to FIG. 3, the plurality of optically anisotropic molecules 141 included in the deflection layer 140 may be arranged so that the major axes $n_e$ thereof head for the first direction (the y-axis direction). The major axes $n_e$ of the plurality of optically anisotropic molecules 141 may be inclined by a first angle θ1 in the second direction (the x-axis direction) with respect to a central axis k1 in the first direction (the y-axis direction). In other words, the plurality of optically anisotropic molecules 141 may be arranged so that the major axes $n_e$ thereof are parallel to a first deflection axis k2 which is inclined in the second direction (the x-axis direction) by a first angle $θ_1$ with respect to the central axis k1. The major axes $n_e$ of the plurality of optically anisotropic molecules 141 may be inclined by a first angle $θ_1$ with respect to a central axis extending in the first direction (the y-axis direction) in a plane that is parallel to the first direction and the second direction (the x-axis direction). For example, the range of the first angle $θ_1$ may be $-5°≤θ_1≤5°$. Also, as shown in FIG. 3, the plurality of optically anisotropic molecules 141 may be provided so that the major axes $n_e$ thereof are arranged in a line along the first deflection axis k2. The plurality of optically anisotropic molecules 141 arranged in a manner described above may be distributed in a region corresponding to any one of the plurality of line electrodes 121. In other words, as shown in FIG. 3, the plurality of optically anisotropic molecules 141 may be arranged so that the major axes $n_e$ thereof head for the direction of or are aligned with the first deflection axis k2 on a region corresponding to any one of the plurality of line electrodes 121. Accordingly, the plurality of optically anisotropic molecules 141 may be arranged so that the major axes $n_e$ thereof head for the direction of or are aligned with the first deflection axis k2 and may be provided at positions corresponding to the plurality of line electrodes 121.

Furthermore, referring to FIG. 4, the plurality of optically anisotropic molecules 141 may be arranged so that the major axes $n_e$ thereof are inclined by a second angle $θ_2$ in a third direction (the z-axis direction) perpendicular to both the first direction (the y-axis direction) and the second direction (the x-axis direction) with respect to the first deflection axis k2. In other words, the plurality of optically anisotropic molecules 141 may be arranged so that the major axes $n_e$ thereof head for the direction of or are aligned with a second deflection axis k3 inclined by a second angle 82 in the third direction (the z-axis direction) with respect to the first deflection axis k2. For example, the range of the second angle $θ_2$ may be $-5°≤θ_2≤5°$. Also, as shown in FIG. 5, the plurality of optically anisotropic molecules 141 may be provided so that the major axes $n_e$ thereof are arranged in a line along the second deflection axis k3. The plurality of optically anisotropic molecules 141 arranged in the manner described above may be distributed in a region corresponding to any one of the plurality of line electrodes 121. In other words, as shown in FIGS. 4 and 5, the plurality of optically anisotropic molecules 141 may be arranged on a region corresponding to any one of the plurality of line electrodes 121 so that the major axes $n_e$ thereof are arranged to head for or align with the direction of the second deflection axis k3. Accordingly, the plurality of optically anisotropic molecules 141 arranged so that the major axes $n_e$ thereof head for or align with the direction of the second deflection axis k3 may be provided at a position corresponding to each of the plurality of line electrodes 121.

As described above with reference to FIGS. 3 to 5, the plurality of optically anisotropic molecules 141 may be arranged so that the major axes $n_e$ thereof are generally directed in the first direction (the y-axis direction). Also, the plurality of optically anisotropic molecules 141 may be arranged so that the major axes $n_e$ thereof are inclined by a first angle $θ_1$ from the central axis k1 in the second direction (the x-axis direction), and at the same time, the major axes $n_e$ are inclined by the second angle $θ_2$ in the third direction (the z-axis direction) from the first deflection axis k2.

Figure 6:
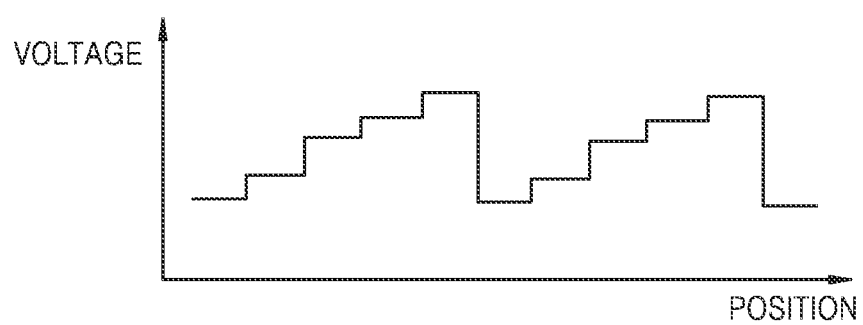
FIG. 6 is a diagram showing a voltage applied to a plurality of line electrodes of FIG. 1 according to an embodiment.
Figure 7:
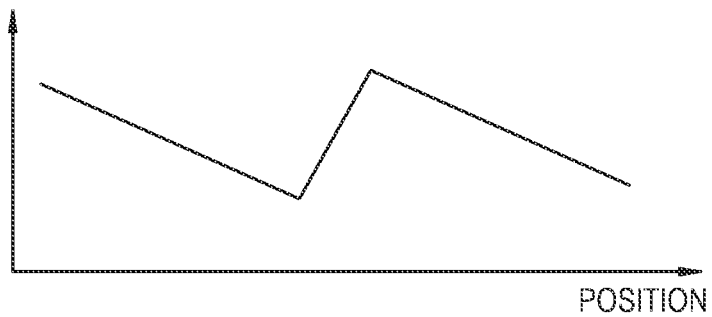
FIG. 7 is a diagram showing a phase change distribution with respect to light of first polarized light ⊙ by the deflection layer of FIG. 1 according to an embodiment.
Figure 8:
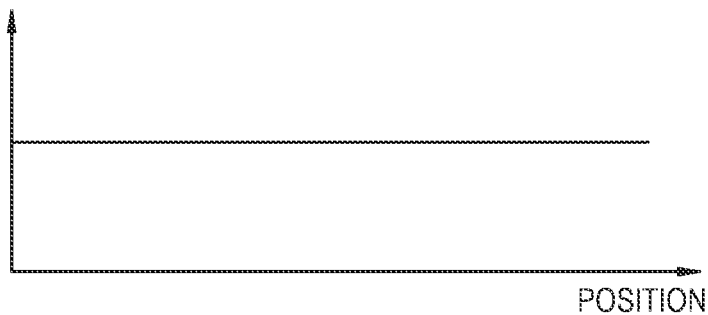
FIG. 8 is a diagram showing a phase change distribution with respect to light of second polarized light ↔ by the deflection layer of FIG. 1 according to an embodiment.

FIG. 6 is a diagram showing a voltage applied to the plurality of line electrodes 121 of FIG. 1. FIG. 7 is a diagram showing a phase change distribution with respect to light of first polarized light ☉ by the deflection layer 140 of FIG. 1. FIG. 8 is a diagram showing a phase change distribution with respect to light of second polarized light ↔ by the deflection layer 140 of FIG. 1.

Referring to FIG. 6, a voltage applied to the plurality of line electrodes 121 may be repeated in a stepwise manner. At this point, the second electrode layer 130 (refer to FIG. 1) may be ground (GND). Positions indicated by the horizontal axis of FIG. 6 indicate positions of the plurality of line electrodes 121 of FIG. 1 in the second direction (the x-axis direction). The stepwise voltage forms an electric field distribution in the deflection layer 140, and the plurality of optically anisotropic molecules 141 (refer to FIG. 1) are aligned depending on a direction of the electric field. For example, the plurality of optically anisotropic molecules 141 may have a positive-type dielectric anisotropy, and in this case, the direction of a 'director', that is, the major axes $n_e$ (refer to FIG. 2) are arranged in a direction of the electric field. Unlike this, when the plurality of optically anisotropic molecules 141 have a negative-type dielectric anisotropy, the major axes $n_e$ may be arranged in a direction perpendicular to the direction of the electric field. The degree of rotation of the plurality of optically anisotropic molecules 141 depends on the strength of the electric field at each position. Accordingly, as shown in FIG. 6, when a stepwise voltage is applied to the plurality of line electrodes 121, the arrangement of the plurality of optically anisotropic molecules 141 is slightly different at each position of the plurality of line electrodes 121. Since the refractive indexes of the plurality of optically anisotropic molecules 141 (e.g., liquid crystal molecules) in the major axes $n_e$ direction and the minor axes $n_o$ (refer to FIG. 2) direction perpendicular the major axes $n_e$ direction are different from each other, a birefringence gradient may be formed in the deflection layer 140 according to the distribution of directors of the plurality of optically anisotropic molecules 141.

Referring to FIG. 7, the illustrated phase change distribution may be a stepwise distribution. For example, the distribution of the phase change of the incident light L1 of the first polarized light ⊙ of FIG. 1 may show a stepwise distribution opposite to the stepwise voltage of FIG. 6. In this case, the incident light L1 of the first polarized light ⊙ of FIG. 1 is polarized light parallel to a director direction, that is, the direction of the major axes $n_e$ of the plurality of optically anisotropic molecules 141. On the other hand, the incident light L2 of the second polarized light ↔ perpendicular to the major axes $n_e$ direction of the plurality of optically anisotropic molecules 141 may not exhibit a birefringence gradient in the deflection layer 140. As shown in FIG. 8, the phase change with respect to the incident light L2 of second polarized light ↔ is constant according to positions. That is, the incident light L2 of the second polarized light ↔ may be transmitted such that there is no change in birefringence in the deflection layer 140. Accordingly, the incident light L2 of the second polarized light ↔ maintains the traveling direction even after passing through the deflection layer 140 and is not deflected. The degree of deflection of the incident light L1 of the first polarized light ⊙ may be controlled by a voltage between the first electrode layer 120 and the second electrode layer 130. In other words, the direction of deflection of the incident light L1 is controlled by forming a birefringence gradient in the deflection layer 140 suitable for a desired deflection direction by controlling a voltage applied to each of the plurality of line electrodes 121 included in the first electrode layer 120.

Figure 9:
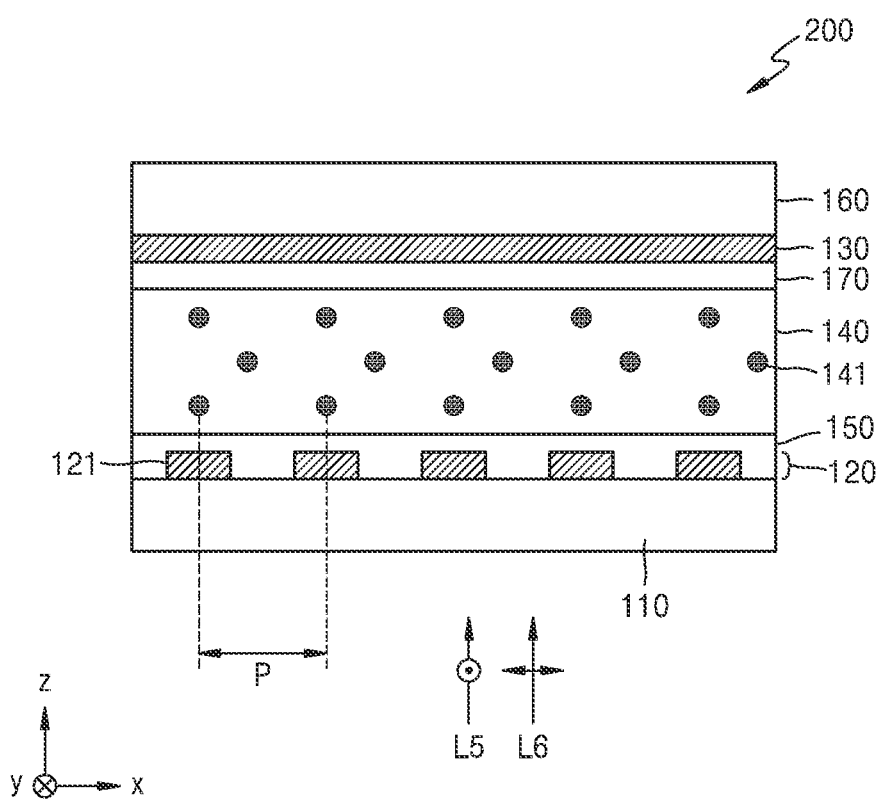
FIG. 9 is a schematic diagram of a configuration of a beam deflector according to an embodiment.
Figure 10:
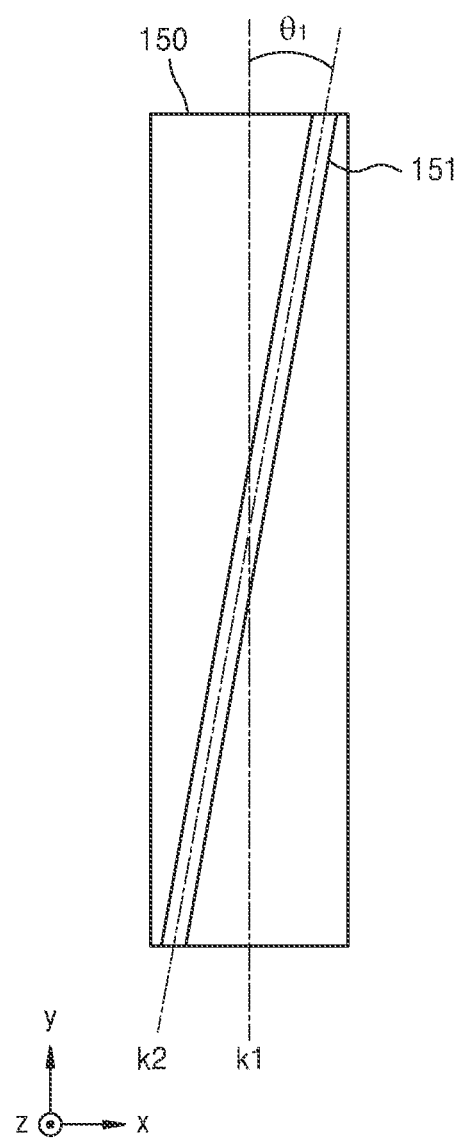
FIG. 10 is a schematic plan view illustrating a state in which a concave unit is formed on a first alignment layer included in the beam deflector of FIG. 9 according to an embodiment.
Figure 11:
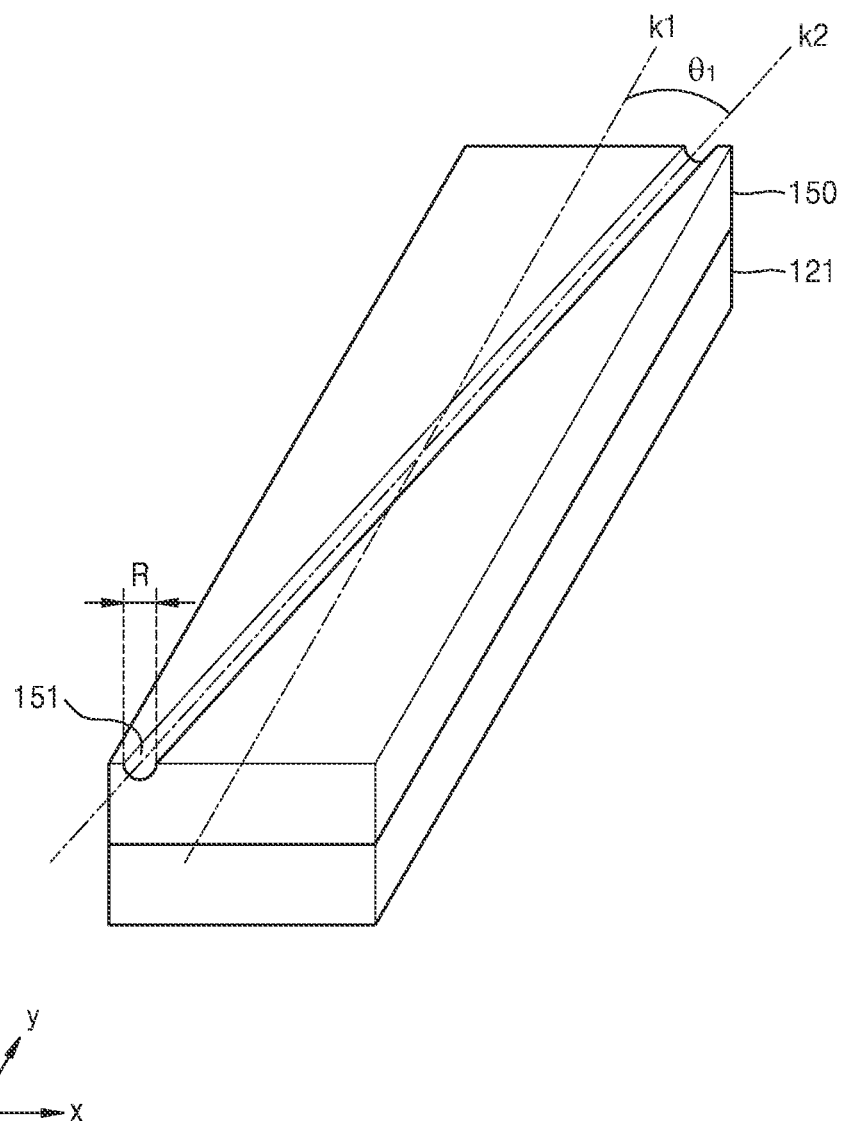
FIG. 11 is a schematic perspective view illustrating a state in which a concave unit is formed on a first alignment layer included in the beam deflector of FIG. 9 according to an embodiment.
Figure 12:
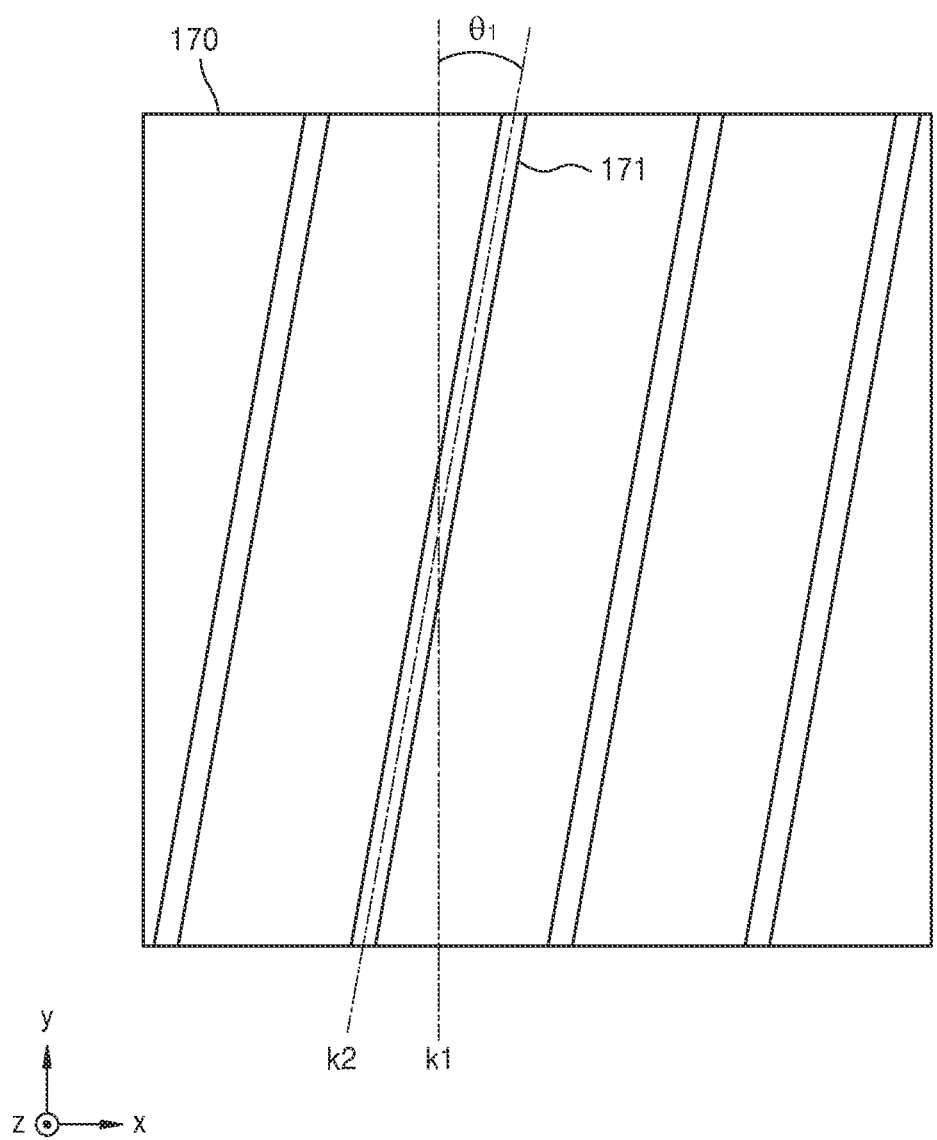
FIG. 12 is a schematic plan view illustrating a state in which a concave unit is formed on a second alignment layer included in the beam deflector of FIG. 9 according to an embodiment.

FIG. 9 is a schematic diagram of a configuration of a beam deflector 200 according to an embodiment. FIG. 10 is a schematic plan view illustrating a state in which a concave unit 151 is formed on a first alignment layer 150 included in the beam deflector 200 of FIG. 9. FIG. 11 is a schematic perspective view illustrating a state in which the concave unit 151 is formed on a first alignment layer 150 included in the beam deflector 200 of FIG. 9. FIG. 12 is a schematic plan view illustrating a state in which a concave unit 171 is formed on a second alignment layer 170 included in the beam deflector 200 of FIG. 9. The beam deflector 200 of FIG. 9 may be substantially the same as the beam deflector 100 of FIG. 1 except that the beam deflector 200 further includes a first substrate 110, the first alignment layer 150, a second substrate 160, and the second alignment layer 170. In describing FIG. 9, descriptions previously given with reference to FIGS. 1 to 8 will be omitted.

Referring to FIG. 9, the beam deflector 200 includes a first substrate 110, a first electrode layer 120 on the first substrate 110, a first alignment layer 150 on the first electrode layer 120, a deflection layer 140 on the first alignment layer 150, a second alignment layer 170 on the deflection layer 140, a second electrode layer 130 on the second alignment layer 170, and a second substrate 160 covering the second electrode layer 130. The first electrode layer 120 may include a plurality of line electrodes 121 extending in the first direction (the y-axis direction) and arranged parallel to each other in the second direction (the x-axis direction) crossing the first direction (the y-axis direction). The deflection layer 140 may include a plurality of optically anisotropic molecules 141. The first alignment layer 150 and the second alignment layer 170 may be layers for orienting a plurality of optically anisotropic molecules 141 in the direction shown in FIG. 3. The beam deflector 200 may deflect incident light L5 of first polarized light ⊙ parallel to the first direction (the y-axis direction), but may not deflect incident light L6 of second polarized light ↔ perpendicular to the first polarized light ⊙.

The first substrate 110 and the second substrate 160 may include an insulating material, such as glass or transparent plastic.

The first alignment layer 150 may cover the plurality of line electrodes 121. A portion of the first alignment layer 150 may be formed to be filled between the plurality of line electrodes 121. Referring to FIGS. 10 and 11, a plurality of first grooves 151 may be formed at positions on a surface of the first alignment layer 150 corresponding to the plurality of line electrodes 121. For convenience of description, in FIGS. 10 and 11, only one of the plurality of line electrodes 121 and only one of the plurality of first grooves 151 provided at a position corresponding to the one line electrode 121 are illustrated.

For example, on an upper surface of the first alignment layer 150, the plurality of first grooves 151 may extend in a direction that is inclined by a first angle $\theta_1$ in the second direction (the x-axis direction) with respect to the central axis k1 in the first direction (the y-axis direction). In other words, the plurality of first grooves 151 may be formed parallel to the first deflection axis k2 which is inclined by the first angle $\theta_1$ in the second direction (the x-axis direction) with respect to the central axis k1. The plurality of first grooves 151 may be inclined by a first angle $\theta_1$ with respect to a central axis extending in the first direction (the y-axis direction) in a plane that is parallel to the first direction and the second direction (the x-axis direction). The plurality of optically anisotropic molecules 141 may be disposed along regions corresponding to the plurality of first grooves 151. Accordingly, as shown in FIG. 3, the plurality of optically anisotropic molecules 141 may be arranged in a line along the first deflection axis k2.

As described above, the plurality of first grooves 151 may be formed in a diagonal direction for each of the plurality of line electrodes 121, respectively. In this way, the first alignment layer 150 including the plurality of first grooves 151 may be formed by forming a polyimide PI layer on the first electrode layer 120 and performing a rubbing operation on the polyimide PI layer in a diagonal direction. The plurality of first grooves 151 have a hemispherical shape, and a diameter R of the plurality of first grooves 151 may be in a range from about several nm to about several hundred nm.

When the second electrode layer 130 has a flat plate shape, the second alignment layer 170 may also have a flat plate shape covering the entire second electrode layer 130 corresponding to the second electrode layer 130. However, the disclosure is not limited thereto, and when the second electrode layer 130 is implemented in the same shape as the plurality of line electrodes 121 of the first electrode layer 120, the second alignment layer 170 may be implemented in the same shape as the first alignment layer 150. Also, referring to FIG. 12, similarly to the first alignment layer 150, at positions corresponding to the plurality of line electrodes 121 on the second alignment layer 170, a plurality of second grooves 171 extending in a direction inclined by a first angle $\theta_1$ in the second direction (the x-axis direction) with respect to the central axis k1 in the first direction (the y-axis direction) may be provided. In other words, the plurality of second grooves 171 may be formed parallel to the first deflection axis k2 inclined by the first angle $\theta_1$ in the second direction (the x-axis direction) with respect to the central axis k1. The plurality of second grooves 151 may be inclined by a first angle $\theta_1$ with respect to a central axis extending in the first direction (the y-axis direction) in a plane that is parallel to the first direction and the second direction (the x-axis direction). The plurality of second grooves 171 may be formed on a surface of the second alignment layer 170 in contact with the deflection layer 140. The number of the plurality of second grooves 171 provided in the second alignment layer 170 may be the same as the number of the plurality of line electrodes 121. However, the disclosure is not limited thereto, and the number of the plurality of second grooves 171 may be innumerably larger than the number of the plurality of line electrodes 121. Also, the plurality of second grooves 171 may be provided to face the plurality of first grooves 151. In this way, since the plurality of first grooves 151 and the plurality of second grooves 171 are formed to face each other as described above, the arrangement of the plurality of optically anisotropic molecules 141 in the first deflection axis k2 may be well implemented.

As described above, the plurality of second grooves 171 may be formed in a diagonal direction for each of the plurality of line electrodes 121, respectively. In this way, the second alignment layer 170 including the plurality of second grooves 171 may be formed by forming a polyimide PI layer on the second electrode layer 130 and performing a rubbing operation on the polyimide PI layer in a diagonal direction. The plurality of second grooves 171 have a hemispherical shape, and may have a diameter in a range from several nm to several hundred nm.

Figure 14:
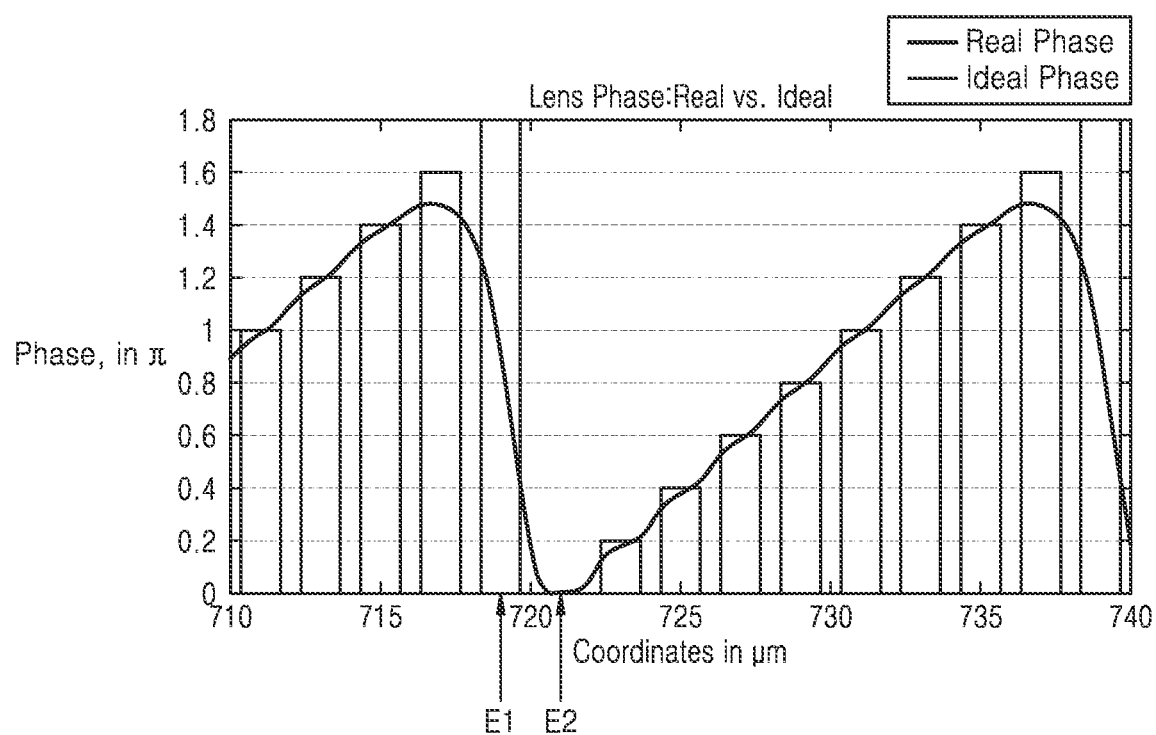
FIG. 14 is a graph illustrating a phase change distribution for incident light according to position of a plurality of line electrodes when a voltage is applied to the beam deflector of FIG. 9 according to an embodiment.

FIG. 13 is a schematic diagram illustrating an electric field formed when a voltage is applied to the plurality of line electrodes 121 included in the beam deflector 200 of FIG. 9. FIG. 14 is a graph illustrating a phase change distribution of incident light L7 according to positions of the plurality of line electrodes 121 when a voltage is applied to the beam deflector 200 of FIG. 9. In FIG. 13, for convenience of description, except for the first substrate 110, the plurality of line electrodes 121, the second electrode layer 130, and the plurality of optically anisotropic molecules 141, remaining constituent elements of the beam deflector 200 are omitted. Also, in FIG. 13, only a structure in which a plurality of optically anisotropic molecules 141 are arranged such that the major axes are arranged in the first direction (the y-axis direction) is shown, but this is only for convenience of description, and the actual arrangement direction of the optically anisotropic molecules 141 is the same as in FIGS. 3 to 5. The contents of FIG. 13 may also be applied to the beam deflector 100 of FIG. 1.

Referring to FIG. 13, a plurality of line electrodes 121 extending in the first direction (the y-axis direction) and arranged parallel to each other in a second direction (the x-axis direction) may be formed on the first substrate 110. Also, the plurality of optically anisotropic molecules 141 arranged so that the major axes thereof are parallel to the first direction (the y-axis direction) may be provided at positions corresponding to the plurality of line electrodes 121. In FIG. 13, although seven line electrodes 121 are shown, this is for convenience of description and the number of the plurality of line electrodes 121 is not limited thereto.

A voltage may be repeatedly applied to the plurality of line electrodes 121 in a stepwise manner. For example, voltages of 3V, 6V, 9V, 0V, 3V, 6V, and 9V may be sequentially applied to the plurality of line electrodes 121 in the second direction (the x-axis direction). At the same time, a voltage may not be applied to the second electrode layer 130. In this case, electric fields having different strengths from each other may be formed between the plurality of line electrodes 121 and the second electrode layer 130 for each position of the plurality of line electrodes 121. Also, as indicated by dotted lines in FIG. 13, the electric fields may be formed by being divided into largely two directions. For example, the electric fields formed in the beam deflector 200 may include an electric field in the third direction (the z-axis direction) formed between the plurality of line electrodes 121 and the second electrode layer 130 and an electric field in the second direction (the x-axis direction) formed between two adjacent line electrodes 121 to which different voltages are applied among the plurality of line electrodes 121.

The electric field in the third direction (the z-axis direction) may align the plurality of optically anisotropic molecules 141 so that the major axes thereof align with the third direction (the z-axis direction). In this case, the plurality of optically anisotropic molecules 141 have a positive-type dielectric anisotropy. A phase of incident light L7 of first polarized light ↔ that is parallel to the first direction (the y-axis direction) passing through the plurality of optically anisotropic molecules 141 with the major axes of which are aligned toward the third direction (the z-axis direction), may be changed depending on the strength of the electric field.

An electric field in the second direction (the x-axis direction) may be formed between the line electrode 121 to which 9V is applied and the adjacent line electrode 121 to which 0V is applied among the plurality of line electrodes 121. The electric field in the second direction (the x-axis direction) may rotate the plurality of optically anisotropic molecules 141 by a predetermined angle so that the major axes directed in the first direction (the y-axis direction) and/or the third direction (the z-axis direction) are directed in the second direction (the x-axis direction). As the strength of the electric field between two adjacent line electrodes 121 among the plurality of line electrodes 121 increases, a rotation angle of the plurality of optically anisotropic molecules 141 in the second direction (x-axis direction), which are provided so that the major axes thereof face the first direction (the y-axis direction) and/or the third direction (the z-axis direction), may increase. In this way, as the plurality of optically anisotropic molecules 141 are rotated in the second direction (the x-axis direction) by the electric field in the second direction (the x-axis direction), an amplitude modulation of the incident light L7 of the first polarized light ↔ may occur. However, in this case, the polarization direction of the incident light L7 of the first polarized light ↔ does not coincide with the direction of the major axes of the plurality of rotated anisotropic molecules 141, and thus, a phase modulation for the incident light L7 of the first polarized light ↔ may be minimized. Accordingly, in the beam deflector 200, a phase loss of the incident light L7 of the first polarized light ↔ according to the fringing-field effect may be minimized.

As described with reference to FIGS. 3 to 5, the major axes of the plurality of optically anisotropic molecules 141 may be inclined at a predetermined angle with respect to the first direction (the y-axis direction) that is the length direction of the plurality of line electrodes 121. Accordingly, the rotation direction of the plurality of optically anisotropic molecules 141 due to an electric field in the second direction (the x-axis direction) may be constant.

Referring to FIG. 14, when a voltage is repeatedly applied to the plurality of line electrodes 121 in a stepwise manner as shown in FIG. 13, as indicated by bars, the phase change of the first polarized light ↔ of the beam deflector 200 for the incident light L7 may ideally be distributed to vary from 0 to $2\pi$ depending on the positions of the plurality of line electrodes 121. For example, the phase change of the first polarized light ↔ of the beam deflector 200 for the incident light L7 may be sequentially changed according to the positions of the plurality of line electrodes 121 in the order of 0, $0.2\pi$, $0.4\pi$, $0.6\pi$, $0.8\pi$, $1.0\pi$, $1.2\pi$, $1.4\pi$, $1.6\pi$, $1.8\pi$, and $2.0\pi$. The distribution of the phase change from 0 to $2.0\pi$ as described above may appear repeatedly in the second direction (the x-axis direction).

On the other hand, as indicated by a curved line, the amount of phase change for the incident light L7 of the first polarized light ↔ of the beam deflector 200 may not substantially be changed from 0 to $2\pi$ according to positions of the plurality of line electrodes 121. The reason is that by the electric field in the second direction (the x-axis direction) formed between two adjacent line electrodes 121 among the plurality of line electrodes 121, the major axes of the plurality of optically anisotropic molecules 141 is rotated to face the second direction (the x-axis direction), and thus, a slight phase loss occurs for the incident light L7 of the first polarized light ↔.

However, as shown in FIG. 13, due to the plurality of optically anisotropic molecules 141 arranged so that the major axes thereof are parallel with a length direction of the plurality of line electrodes 121 extending in the first direction (the y-axis direction), as shown in FIG. 14, the distribution of the phase change with respect to the first polarized light ↔ may be relatively close to an ideal phase change distribution. For example, as described above, by an electric field in the second direction (the x-axis direction) formed between two line electrodes 121 adjacent to each other among the plurality of line electrodes 121 arranged at first and second positions E1 and E2 where a difference in applied voltage is relatively large, the plurality of optically anisotropic molecules 141 may rotate so that the major axes thereof are aligned in a direction having the second direction (the x-axis direction) as a component. In this case, the polarization direction of the incident light L7 of the first polarized light ↔ and the direction of the major axes of the plurality of anisotropic molecules 141 rotated in the second direction (the x-axis direction) are shifted, and thus, the phase modulation for the incident light L7 may be minimized. In this way, even if an electric field in the second direction (the x-axis direction) is formed, the phase modulation for the incident light L7 is minimized, and thus, the distribution of the actual phase change for the incident light L7 of the first polarized light ↔ may be close to an ideal phase change distribution.

Figure 15:
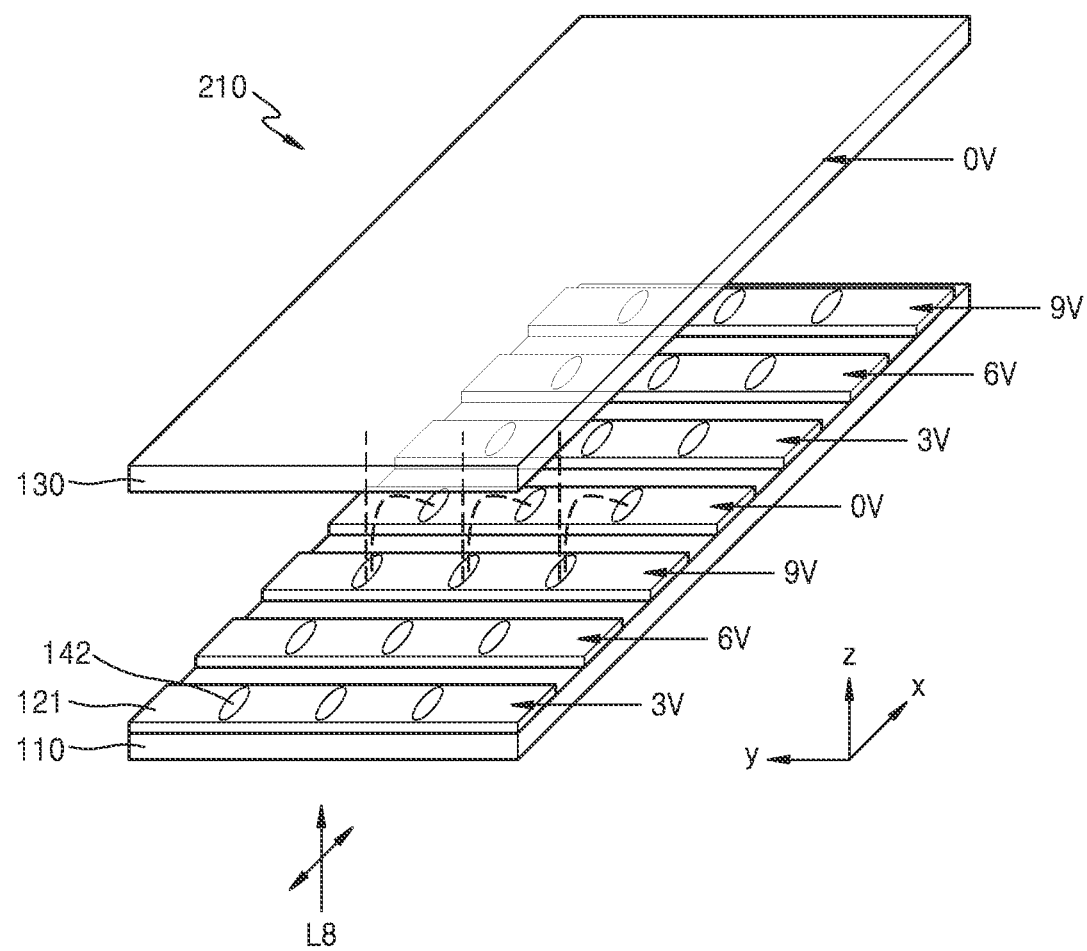
FIG. 15 is a schematic diagram illustrating an electric field formed when a voltage is applied to a plurality of line electrodes included in a beam deflector according to a comparative example.
Figure 16:
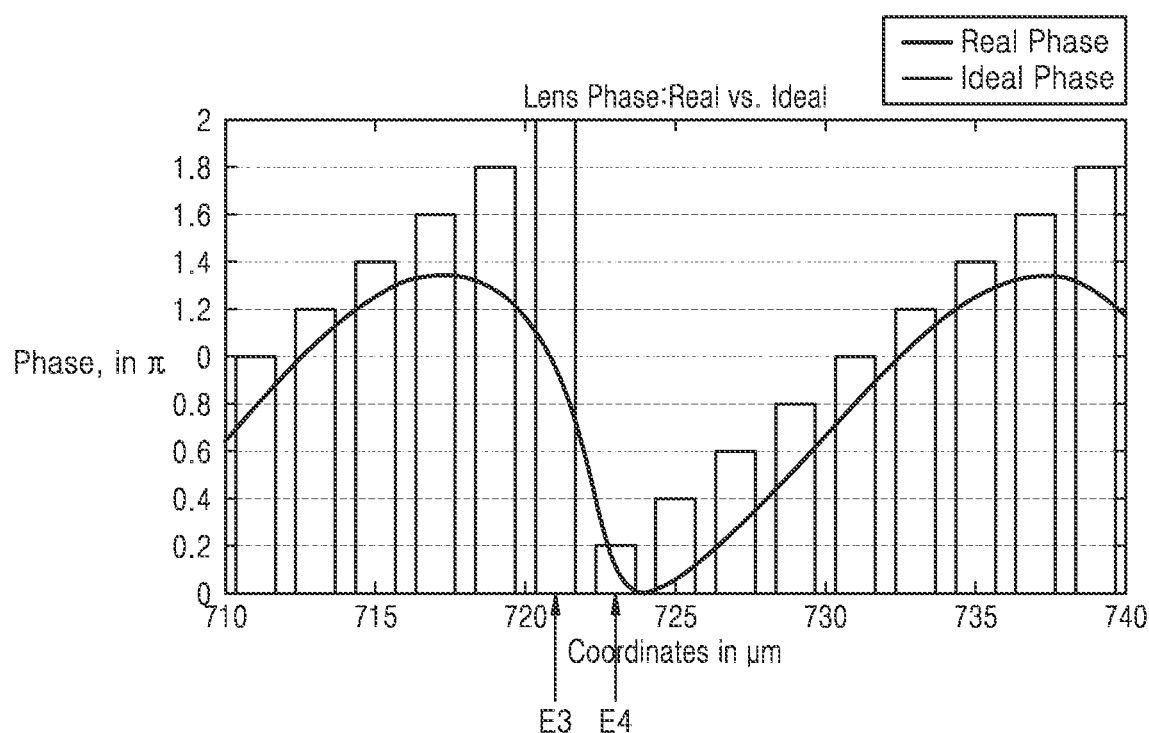
FIG. 16 is a graph illustrating a phase change distribution for incident light according to positions of a plurality of line electrodes when a voltage is applied to the beam deflector of FIG. 15.

FIG. 15 is a schematic diagram illustrating an electric field formed when a voltage is applied to a plurality of line electrodes 121 included in a beam deflector 210 according to a comparative example. FIG. 16 is a graph illustrating a phase change distribution for incident light L8 according to positions of the plurality of line electrodes 121 when a voltage is applied to the beam deflector 210 of FIG. 15.

Referring to FIG. 15, the plurality of line electrodes 121 extending in the first direction (the y-axis direction) and arranged parallel to each other in the second direction (the x-axis direction) are formed on a first substrate 110. Also, a plurality of optically anisotropic molecules 142 arranged so that major axes are parallel to the second direction (the x-axis direction) may be provided at positions corresponding to the plurality of line electrodes 121. Although seven line electrodes 121 are illustrated in FIG. 15, this is for convenience of description, and the number of the plurality of line electrodes 121 is not limited thereto.

A voltage may be repeatedly applied to the plurality of line electrodes 121 in a stepwise manner. For example, voltages of 3V, 6V, 9V, 0V, 3V, 6V, and 9V may be sequentially applied to the plurality of line electrodes 121 in the second direction (the x-axis direction). At the same time, a voltage may not be applied to the second electrode layer 130. In this case, electric fields having different strengths from each other may be formed between the plurality of line electrodes 121 and the second electrode layer 130 for each position of the plurality of line electrodes 121. Also, as indicated by dotted lines in FIG. 15, the electric fields may be formed by being divided into largely two directions. For example, the electric fields formed in the beam deflector 210 may include an electric field in the third direction (the z-axis direction) formed between the plurality of line electrodes 121 and the second electrode layer 130 and an electric field in the second direction (the x-axis direction) formed between two adjacent line electrodes 121 to which different voltages are applied among the plurality of line electrodes 121.

The electric field in the third direction (the z-axis direction) may align the plurality of optically anisotropic molecules 142 so that the major axes thereof align with the third direction (the z-axis direction). In this case, the plurality of optically anisotropic molecules 142 have a positive-type dielectric anisotropy. A phase of incident light L8 of second polarized light that is parallel to the second direction (the x-axis direction) passing through the plurality of optically anisotropic molecules 142 aligned so that the major axes thereof head for the third direction (the z-axis direction) may be changed to become maximum depending on the strength of the electric field.

An electric field in the second direction (the x-axis direction) may be formed between the line electrode 121 to which 9V is applied and the adjacent line electrode 121 to which 0V is applied among the plurality of line electrodes 121. The electric field in the second direction (the x-axis direction) may rotate the plurality of optically anisotropic molecules 142 by a predetermined angle so that the major axes thereof that are directed in the first direction (the y-axis direction) and/or the third direction (the z-axis direction) are rotated to be directed in the second direction (the x-axis direction). As the strength of the electric field between two adjacent line electrodes 121 among the plurality of line electrodes 121 increases, a rotation angle in the second direction (the x-axis direction) of the plurality of optically anisotropic molecules 142 arranged so that the major axes thereof face the third direction (z-axis direction) may increase. As such, the direction of the major axes of the plurality of optically anisotropic molecules 142 rotated in the second direction (the x-axis direction) by an electric field in the second direction (the x-axis direction) and a polarization direction of the incident light L8 of the second polarized light parallel to the second direction (the x-axis direction) may be parallel to each other. Accordingly, the phase of the incident light L8 of second polarized light parallel to the second direction (the x-axis direction) may be modulated by the plurality of optically anisotropic molecules 142 rotated in the second direction (the x-axis direction). The phase modulation of the incident light L8 of the second polarization is caused by an electric field in the second direction (the x-axis direction) between two adjacent line electrodes 121 among the plurality of line electrodes 121, and is not intended and an unwanted phase change, that is, it corresponds to a phase loss. As described above, in the beam deflector 210, due to the fringing-field effect at the adjacent electrodes, when the major axis $n_e$ of the anisotropic molecule 142 extending in the third direction (the z-axis direction) is rotated in the second direction (the x-axis direction), since the direction of the major axis $n_e$ of the anisotropic molecule 142 and the polarization direction of the incident light L8 coincide with each other, the phase loss for the incident light L8 may be greater than the case of the beam deflector 200 of FIG. 13. Referring to FIG. 16, when a voltage is repeatedly applied to the plurality of line electrodes 121 in a stepwise manner as shown in FIG. 15, as indicated by bars, the amount of phase change for incident light L8 of the second polarized light of the beam deflector 210 may ideally be distributed to vary from 0 to $2\pi$ depending on the positions of the plurality of line electrodes 121. For example, the phase change of the first polarized light of the beam deflector 210 for the incident light L8 may be sequentially changed according to the positions of the plurality of line electrodes 121 in the order of 0, $0.2\pi$, $0.4\pi$, $0.6\pi$, $0.8\pi$, $1.0\pi$, $1.2\pi$, $1.4\pi$, $1.6\pi$, $1.8\pi$, and $2.0\pi$. The distribution of the phase change from 0 to 2.07 as described above may appear repeatedly in the second direction (the x-axis direction).

On the other hand, as indicated by a curved line, the amount of phase change for the incident light L8 of the second polarized light of the beam deflector 210 may not substantially be changed from 0 to $2\pi$ according to positions of the plurality of line electrodes 121. The reason is that by the electric field in the second direction (the x-axis direction) formed between two adjacent line electrodes 121 among the plurality of line electrodes 121, the arrangement of the plurality of optically anisotropic molecules 142 is suppressed from changing in the third direction (the z-axis direction), and the major axes $n_e$ are rotated to align in a direction having the second direction (the x-axis direction) as a component, and thus, a phase loss occurs for the incident light L8.

In particular, as shown in FIG. 15, by the plurality of optically anisotropic molecules 142 arranged so that the major axes thereof are provided to be perpendicular to a length direction of the plurality of line electrodes 121 extending in the first direction (the y-axis direction), the distribution of phase change for the incident light L8 of the second polarized light may be far from the relatively ideal distribution of the phase change. For example, as described above, by an electric field in the second direction (the x-axis direction) formed between two line electrodes 121 adjacent to each other among the plurality of line electrodes 121 arranged at first and second positions E3 and E4 where a difference in applied voltage is relatively large, the plurality of optically anisotropic molecules 142 that are arranged in the third direction (the z-axis direction) may be slightly oriented in the second direction (the x-axis direction). In this case, the direction of the major axes $n_e$ of the plurality of optically anisotropic molecules 142 may be parallel to the polarization direction (the x-axis direction) of the incident light L8 of the second polarization as much as the plurality of optically anisotropic molecules 142 are oriented in the second direction. In this case, the phase loss of the incident light L8 of the second polarized light may increase because the direction of the major axes $n_e$ of the plurality of optically anisotropic molecules 142 and the polarization direction (the x-axis direction) of the incident light L8 of the second polarized light are parallel. As described above, as an electric field in the second direction (the x-axis direction) formed between two adjacent line electrodes 121 among the plurality of line electrodes 121 increases, the degree of parallelism between the major axis direction of the plurality of optically anisotropic molecules 142 and the polarization direction (the x-axis direction) of the incident light L8 of the second polarized light increases, thus, a phase loss of the incident light L8 may increase.

Figure 17:
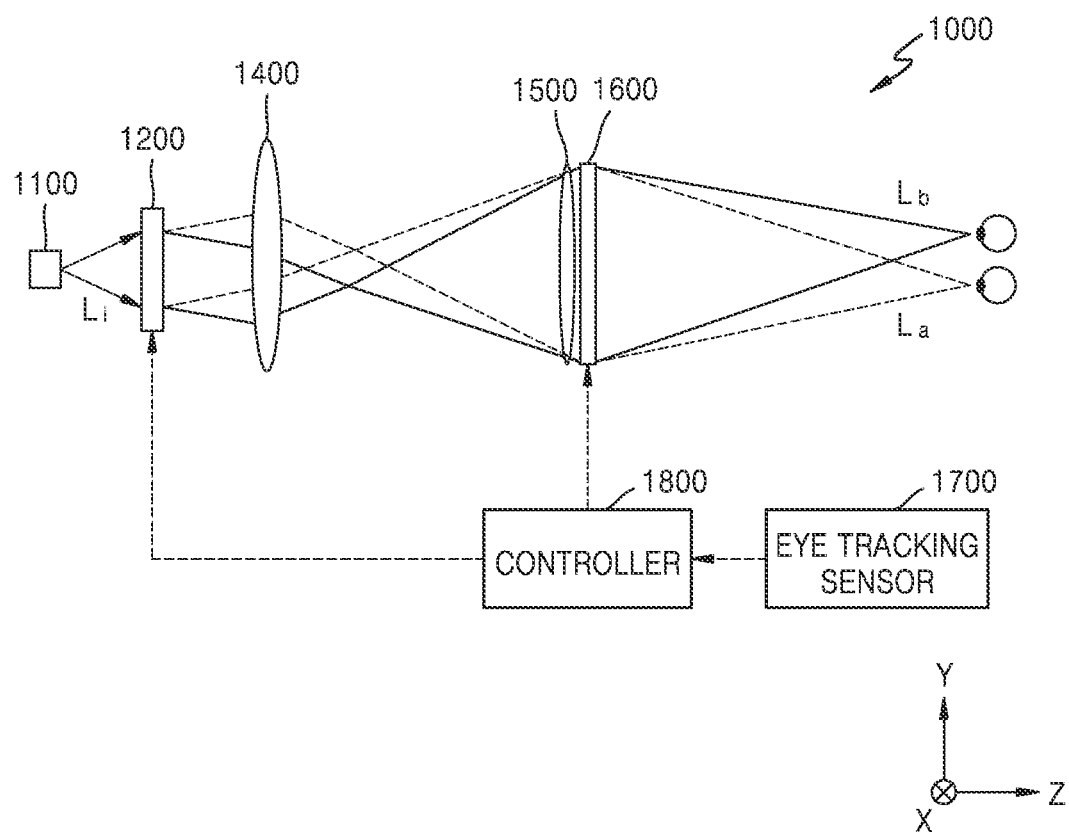
FIG. 17 is a schematic cross-sectional view showing a structure of a 3D display device according to an embodiment.

FIG. 17 is a schematic cross-sectional view showing a structure of a three-dimensional (3D) display device 1000 according to an embodiment.

The 3D display device 1000 includes a light source 1100 configured to provide a coherent light beam, a beam deflector 1200 configured to deflect light from the light source 1100, and a spatial light modulator 1600 configured to diffract light to form a holographic image.

The 3D display device 1000 may further include an f-theta (f-θ) lens 1400 configured to enlarge light deflected by the beam deflector 1200 to a size corresponding to the spatial light modulator 1600 and control a focal trajectory according to the deflection direction to be a plane and a field lens 1500 configured to focus a holographic image formed by the spatial light modulator 1600 on a predetermined space. The arrangement order of the field lens 1500 and the optical modulator 1600 is not limited to the illustrated shape, and arrangement positions may be interchanged.

Also, the 3D display device 1000 may further include an eye tracking sensor 1700 configured to track locations of viewer's left and right eyes and a controller 1800 configured to control a polarization direction of light in the beam deflector 1200 and perform a computer generated hologram (CGH) calculation for a hologram pattern formed by the spatial light modulator 1600.

The beam deflector 1200 may deflect light $L_i$ from the light source 1100 in two predetermined directions. A first branched light $L_a$ and a second branched light $L_b$ branched from the beam deflector 1200 respectively may be light directed to the left and right eyes of a viewer. As the beam deflector 1200, one of the beam deflector 100 of FIG. 1 or the beam deflector 200 of FIG. 9 may be employed.

After the light $L_i$ from the light source 1100 is deflected by the beam deflector 1200, the light $L_i$ enters the spatial light modulator 1600 via the f-theta lens 1400 and the field lens 1500.

Two directional beams, that is, the first branched light $L_a$ and the second branched light $L_b$ are modulated by the spatial light modulator 1600. The spatial light modulator 1600 forms a hologram pattern having an interference fringe for modulating light. Since incident light is diffracted and modulated by the hologram pattern formed by the spatial light modulator 1600, a holographic image may be reproduced at a position in a predetermined space. The first branched light $L_a$ is used for a left-eye hologram, and the second branched light $L_b$ is used for a right-eye hologram. That is, a left-eye hologram image may be reproduced by the spatial light modulator 1600 by the first branch light $L_a$, and a right-eye holographic image may be reproduced by the spatial light modulator 1600 by the second branch light $L_b$. In this way, since the holographic image is formed only at the viewing positions of the eyes of the viewer, the amount of CGH calculation may be significantly reduced.

The controller 1800 may control the beam deflector 1200 based on information on the position of the viewer's left and right eyes sensed by the eye tracking sensor 1700. Also, the controller 1800 may control the spatial light modulator 1600 so that the left-eye holographic image is reproduced by the first branch light $L_a$ and the right-eye holographic image is reproduced by the second branch light $L_b$.

Figure 18:
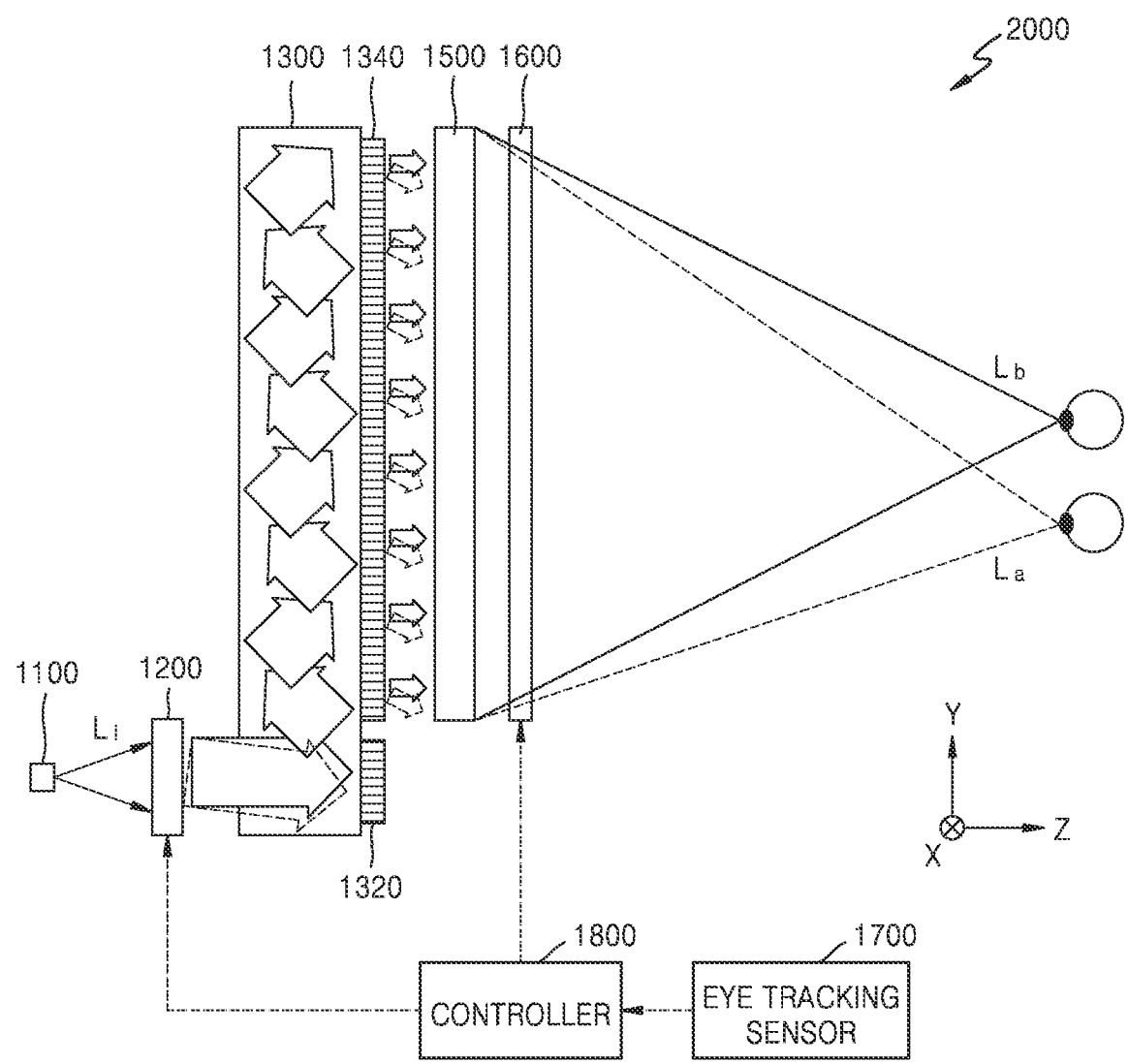
FIG. 18 is a schematic perspective view showing a structure of a 3D display device according to an embodiment.

FIG. 18 is a schematic perspective view showing a structure of a 3D display device 2000 according to an embodiment.

The 3D display device 2000 includes a light source 1100 configured to provide a coherent light beam, a beam deflector 1200 configured to deflect light from the light source 1100, and a spatial light modulator 1600 configured to diffract incident light to form a holographic image. Also, the 3D display device 2000 may further include a light guide unit 1300 for guiding light from the light source 1100 to face the spatial light modulator 1600 and a field lens 1500 for focusing a holographic image on a predetermined space. The arrangement order of the field lens 1500 and the optical modulator 1600 is not limited to the illustrated shape, and arrangement positions may be changed.

Also, the 3D display device 2000 may further include an eye tracking sensor 1700 configured to track locations of a viewer's left and right eyes and a controller 1800 configured to control a polarization direction of light in the beam deflector 1200 and perform a computer generated hologram (CGH) calculation for a hologram pattern formed by the spatial light modulator 1600.

The beam deflector 1200 may deflect light $L_i$ from the light source 1100 in two predetermined directions. A first branched light $L_a$ and a second branched light $L_b$ branched from the beam deflector 1200 respectively may be light directed to the left and right eyes of a viewer. As the beam deflector 1200, one of the beam deflector 100 of FIG. 1 or the beam deflector 200 of FIG. 9 may be employed.

The 3D display device 2000 of FIG. 18 has a configuration having a thickness less than that of the 3D display device 1000 of FIG. 17. A length of the 3D display device 1000 of FIG. 17 in the z-axis direction may increase as a size difference between the beam deflector 1200 and the spatial light modulator 1600 increases. On the other hand, since the 3D display device 2000 of FIG. 18 employs the light guide unit 1300 that may enlarge light deflected by the beam deflector 1200 to fit the size of the spatial light modulator 1600, a length in the z-axis direction may be relatively reduced.

After light $L_i$ from the light source 1100 is deflected by the beam deflector 1200, the light is guided by the light guide unit 1300, is enlarged to a size corresponding to the spatial light modulator 1600, and is emitted in a direction toward the spatial light modulator 1600. The light guide unit 1300 may further include an input coupler 1320 through which light deflected by the beam deflector 1200 is incident and an output coupler 1340 guided by the light guide unit 1300 and outputting progressed light.

Two directional beams emitted through the light guide unit 1300 are incident on the spatial light modulator 1600 through the field lens 1500. The spatial light modulator 1600 forms a hologram pattern having an interference fringe for modulating incident light. Incident light is diffracted and modulated by the hologram pattern formed by the spatial light modulator 1600 so that a holographic image may be reproduced at a position in a predetermined space. A left-eye hologram image may be reproduced at a left-eye position and a right-eye hologram image may be reproduced at a right-eye position.

The controller 1800 may control the beam deflector 1200 based on information on the position of the viewer's left and right eyes sensed by the eye tracking sensor 1700. Also, the controller 1800 may control the spatial light modulator 1600 so that the left-eye holographic image is reproduced by the first branch light $L_a$ and the right-eye holographic image is reproduced by the second branch light $L_b$. In this way, since the holographic image is formed only at the viewing position of a viewer, the amount of CGH calculation may be significantly reduced.

The position of the beam deflector 1200 is illustrated in the 3D display devices 1000 and 2000 of FIGS. 17 and 18, but the position of the beam deflector 1200 is not limited thereto, and may be changed differently. For example, the beam deflector 1200 may be arranged at a position between the field lens 1500 and the spatial light modulator 1600, or the position of the spatial light modulator 1600 may be changed to be disposed between the field lens 1500 and the beam deflector 1200.

According to a beam deflector and a 3D display device including the beam deflector described above, when the arrangement direction of a major axes of optically anisotropic molecules is arranged in a direction parallel to a length direction of lower line electrodes, a phase loss of incident light due to a fringing-field effect by an electric field formed between two adjacent lower line electrodes may be minimized.

Further, the re-arrangement of optically anisotropic molecules according to an electric field that is formed between two adjacent lower line electrodes and is perpendicular to the length direction of the lower line electrodes may have a constant directionality by arranging the major axes of the optically anisotropic molecules to be inclined at a predetermined angle with respect to the length direction of the lower line electrode.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A beam deflector comprising:
   a first electrode layer comprising a plurality of line electrodes, each of the plurality of line electrodes extending in a first direction and arranged parallel to each other in a second direction crossing the first direction;
   a second electrode layer separated from the first electrode layer by a distance to face the first electrode layer; and a deflection layer between the first electrode layer and the second electrode layer, the deflection layer comprising a plurality of optically anisotropic molecules controlled by an electric field formed between the first electrode layer and the second electrode layer, wherein each of the plurality of optically anisotropic molecules has an ellipse shape having a major axis and a minor axis, wherein the major axis of each of the plurality of optically anisotropic molecules is arranged to head for the first direction.

2. The beam deflector of claim 1, wherein the major axis of each of the plurality of optically anisotropic molecules is arranged to be inclined by a first angle $\theta_1$ with respect to a central axis extending in the first direction, and the first angle $\theta_1$ is in a range of $-5°\leq\theta_1\leq5°$.

3. The beam deflector of claim 1, wherein the major axis of each of the plurality of optically anisotropic molecules is inclined by a second angle $\theta_2$ in a third direction perpendicular to both the first direction and the second direction with respect to a central axis extending in the first direction.

4. The beam deflector of claim 3, wherein the second angle $\theta_2$ is in a range of $-5°\leq\theta_2\leq5°$.

5. The beam deflector of claim 1, further comprising a first alignment layer between the first electrode layer and the deflection layer, wherein a plurality of first grooves are arranged on a surface of the first alignment layer at positions corresponding to the plurality of line electrodes, and wherein the plurality of first grooves extend in a direction inclined by a first angle $\theta_1$ in the second direction with respect to a central axis extending in the first direction in the plane that is parallel to the first direction and the second direction.

6. The beam deflector of claim 5, wherein the plurality of optically anisotropic molecules are arranged in a line along a region corresponding to the plurality of first grooves.

7. The beam deflector of claim 5, further comprising a second alignment layer between the second electrode layer and the deflection layer, wherein a plurality of second grooves are arranged on a surface of the second alignment layer at positions corresponding to the plurality of line electrodes, and wherein the plurality of second grooves extend in the direction inclined by the first angle $\theta_1$ in the second direction with respect to the central axis extending in the first direction in the plane that is parallel to the first direction and the second direction.

8. The beam deflector of claim 7, wherein the plurality of second grooves are provided to face the plurality of first grooves.

9. The beam deflector of claim 1, wherein the distance between the first electrode layer and the second electrode layer is in a range from about 1.5 μm to about 6.0 μm.

10. The beam deflector of claim 1, wherein a separation distance in the second direction between two adjacent line electrodes among the plurality of line electrodes is in a range from about 1.0 μm to about 6.0 μm.

11. The beam deflector of claim 1, wherein the distance between the first electrode layer and the second electrode layer is equal to a separation distance in the second direction between two adjacent line electrodes among the plurality of line electrodes.

12. The beam deflector of claim 1, wherein each of the plurality of optically anisotropic molecules has a positive-type dielectric anisotropy.

13. The beam deflector of claim 1, wherein each of the plurality of optically anisotropic molecules comprises a liquid crystal molecule.

14. The beam deflector of claim 1, wherein the second electrode layer has a flat plate shape facing all of the plurality of line electrodes.

15. A 3D display device comprising:
a light source configured to provide a coherent light;
a beam deflector configured to deflect light from the light source, the beam deflector comprising:
a first electrode layer comprising a plurality of line electrodes, each of the plurality of line electrodes extending in a first direction and arranged parallel to each other in a second direction crossing the first direction;
a second electrode layer separated from the first electrode layer by a distance to face the first electrode layer; and
a deflection layer between the first electrode layer and the second electrode layer, the deflection layer comprising a plurality of optically anisotropic molecules controlled by an electric field formed between the first electrode layer and the second electrode layer; and
a spatial light modulator configured to diffract incident light from the beam deflector to form a holographic image, wherein
each of the plurality of optically anisotropic molecules has an ellipse shape having a major axis and a minor axis, wherein the major axis of each of the plurality of optically anisotropic molecules is arranged to head for the first direction.

16. The 3D display device of claim 15, wherein the major axis of each of the plurality of optically anisotropic molecules is arranged to be inclined by a first angle $\theta_1$ with respect to a central axis extending in the first direction, and the first angle $\theta_1$ is in a range of $-5°\leq\theta_1\leq5°$.

17. The 3D display device of claim 15, wherein the beam deflector further comprises a first alignment layer between the first electrode layer and the deflection layer, wherein a plurality of first grooves are arranged on a surface of the first alignment layer at positions corresponding to the plurality of line electrodes, and wherein the plurality of first grooves extend in a direction inclined by a first angle $\theta_1$ in the second direction with respect to a central axis in the first direction in the plane that is parallel to the first direction and the second direction.

18. The 3D display device of claim 17, wherein the plurality of optically anisotropic molecules are arranged in a line along a region corresponding to the plurality of first grooves.

19. The 3D display device of claim 15, further comprising:
an eye tracking sensor configured to sense positions of left and right eyes of a viewer; and
a controller configured to control the beam deflector based on the sensed positions of the left and right eyes of the viewer.

20. The 3D display device of claim 15, further comprising a light guide unit between the light source and the spatial light modulator, the light guide unit being configured to enlarge the coherent light provided from the light source to fit a size of the spatial light modulator.

* * * * *